Figure 1:
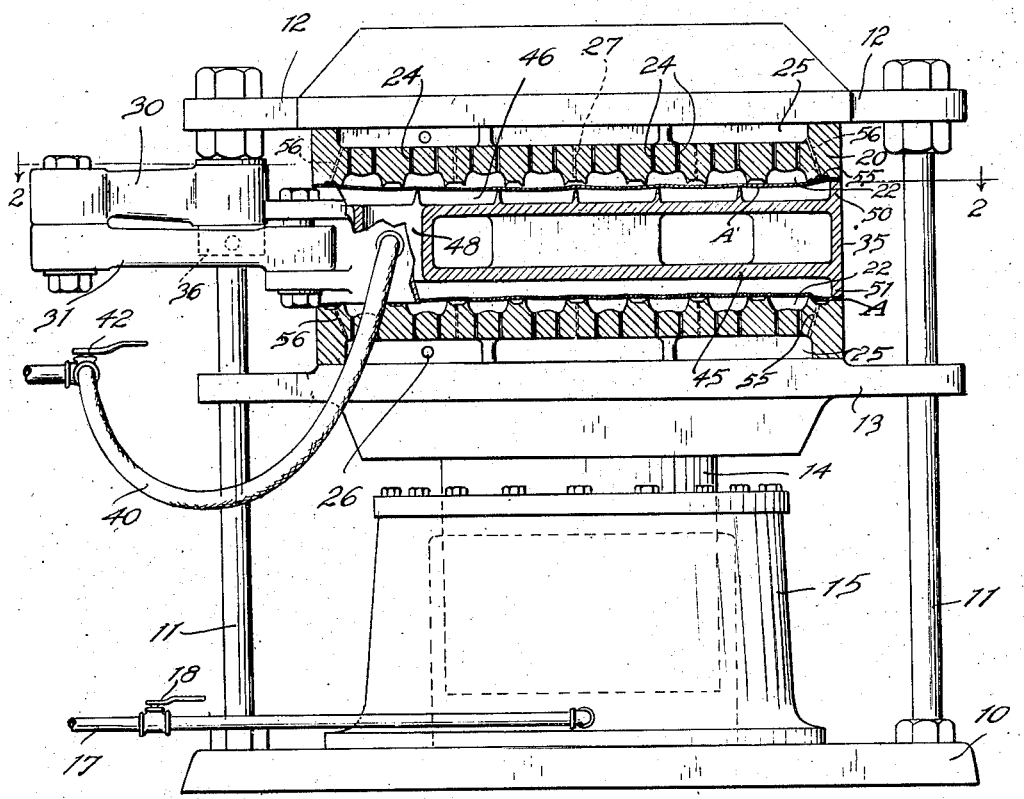

Feb. 23, 1926.  1,574,113
F. T. ROBERTS
APPARATUS FOR MAKING HOLLOW RUBBER ARTICLES
Filed August 26, 1921   2 Sheets-Sheet 1

INVENTOR
Fred Thomas Roberts.
By Bates & Macklin,
ATTORNEYS

Feb. 23, 1926.
1,574,113
F. T. ROBERTS
APPARATUS FOR MAKING HOLLOW RUBBER ARTICLES
Filed August 26, 1921   2 Sheets-Sheet 2
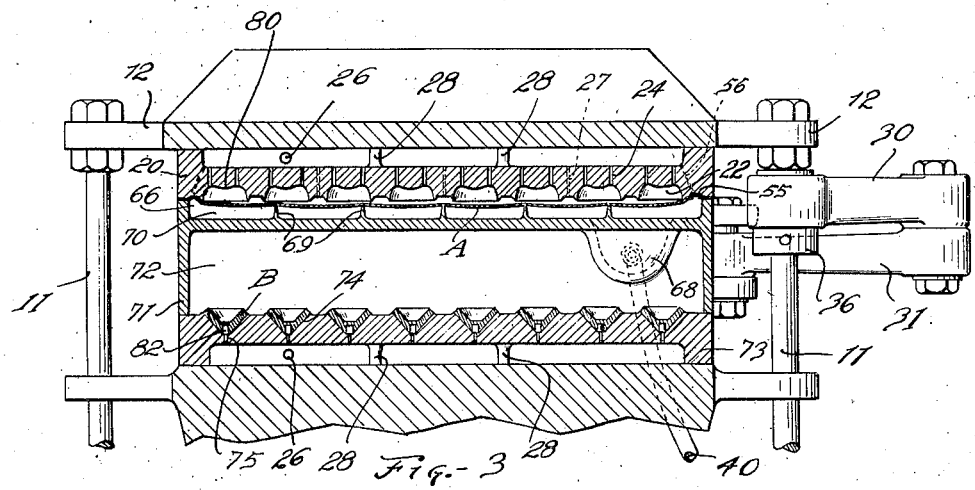
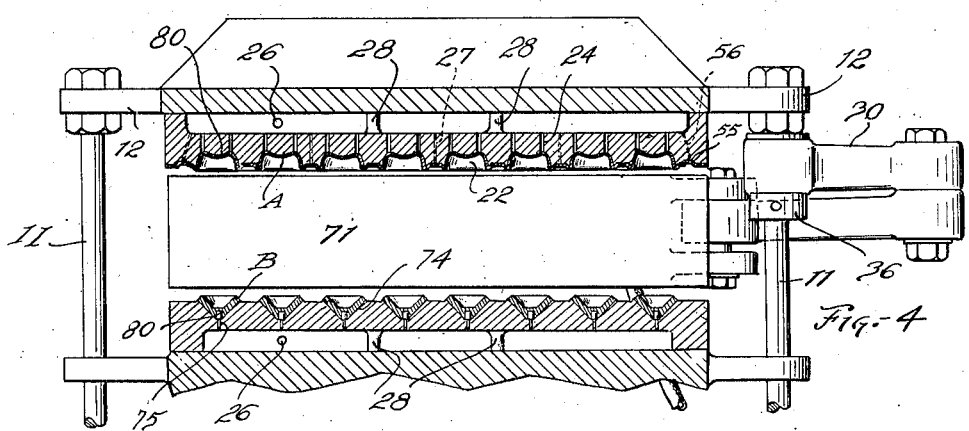
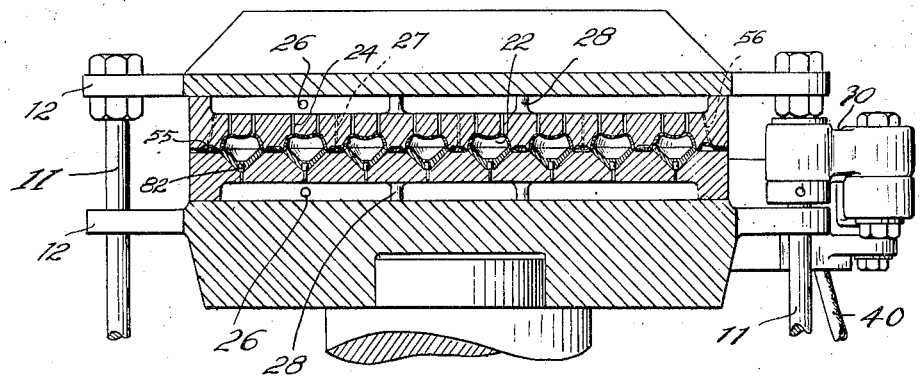
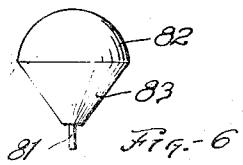
INVENTOR
Fred Thomas Roberts
By Bates & Macklin
ATTORNEYS Patented Feb. 23, 1926.

1,574,113

UNITED STATES PATENT OFFICE.

FRED THOMAS ROBERTS, OF YONKERS, NEW YORK, ASSIGNOR TO PARAMOUNT RUBBER CONSOLIDATED, INC., OF TUCKAHOE, NEW YORK, A CORPORATION OF DELAWARE.

APPARATUS FOR MAKING HOLLOW RUBBER ARTICLES.

Application filed August 26, 1921. Serial No. 495,489.

*To all whom it may concern:*

Be it known that I, FRED THOMAS ROBERTS, a citizen of the United States, residing at Yonkers, in the county of Westchester and State of New York, have invented a certain new and useful Improvement in Apparatus for Making Hollow Rubber Articles, of which the following is a full, clear, and exact description, reference being had to the accompanying drawings.

This invention relates to an apparatus for the manufacture of hollow articles of plastic material wherein means are provided for forcing the article into mold cavities by fluid pressure. The object is to provide a device adapted to rapidly and economically form hollow articles from sheet stock. The device is very effective in forming a large number of articles simultaneously.

Another object is to provide a device for the purpose mentioned having provisions for the clamping of sheet stock independently of the edges of the mold cavities while the stock is being seated within the cavities whereby a smooth and regular seating of the stock within the cavities is effected.

The invention is hereinafter more fully described in connection with the embodiments shown in the drawings which illustrate devices adapted to manufacture balls and flush tank ball floats respectively.

Figure 2:
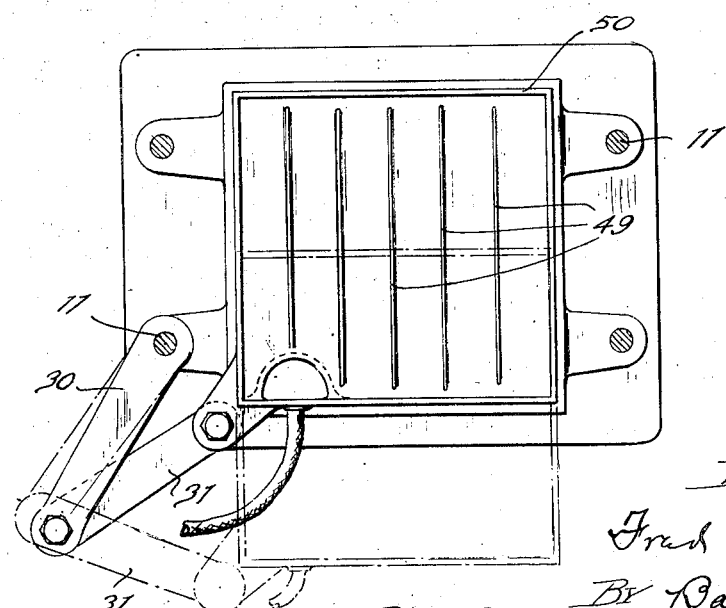

In the drawings, Fig. 1 is an elevation partly in section of an apparatus involving the principles of my invention adapted to manufacture balls; Fig. 2 is a view taken on the line 2—2 of Fig. 1; Fig. 3 is a fragmentary sectional view of a device of slightly different form involving the principles of my invention adapted for the manufacture of flush ball floats; Fig. 4 is a similar view showing the stock in seated position upon the upper and lower molds; Fig. 5 is a similar view showing the intermediate carrier withdrawn and the mold members brought together in position to join the stock in the mold cavities; Fig. 6 is a view showing the product produced by the machine illustrated in Figs. 3 to 5 inclusive.

In the apparatus shown in Figs. 1 and 2, 10 indicates the base of the mold press; 11, upright rods rising therefrom; and 12, the stationary head of the press. 13 designates the movable platen guided by the rods 11 and mounted on the upper end of a plunger 14 operating in a stationary upright cylinder 15. Hydraulic pressure may be admitted to this cylinder through a pipe 17 controlled by a suitable valve 18.

20 and 21 designate the two mold plates each of which is formed with cavities dependent upon the shape of the article to be made. In the particular form shown in Figs. 1 and 2 each mold member has numerous cavities 22 which are bowl shaped. Each of the cavities is connected by vent passages 24 with a chamber 25 in the base of the mold which may be vented to the atmosphere by suitable means such as the vent openings 26. The molds may be held on the head of the press and on the platen respectively by any suitable means. I prefer to provide reinforcing ribs 28 to strengthen the mold members intermediately.

Mounted on one of the upright rods 11, there is shown an arm 30 having pivotally connected therewith a link 31 which is in turn pivotally mounted upon the carrier 35 to be subsequently described. The arm 30 is pivotally mounted on the bar 11 and may be held at the proper height thereon by any suitable means such as a collar 36.

It will be seen that when the mold members are separated, a sheet of rubber or similar material may be manually placed on top of the mold member 21 and another sheet laid on the carrier 35 when it is withdrawn from between the molds and thereafter the carrier may be shoved into place between the molds thus bringing this sheet directly beneath the mold 20. Such sheets are shown at A and A' respectively in Fig. 1.

The carrier 35 is hollow and has an open top and bottom. Communicating with the carrier is a flexible pipe 40 leading from a source of compressed air; the communication of air from the source being controlled by means of a valve 42. To reduce the capacity of the carrier and thereby prevent waste of air and at the same time have the carrier of sufficient height to allow convenient manipulation between the molds, I form the carrier with an interior box-like filler 45. This may conveniently be a hollow member open at one edge. The space above the filler forms a pneumatic chamber 46 directly beneath the upper mold, while the space below the filler forms a chamber 47 directly above the lower mold when the carrier is in position between the molds. These two chambers are connected by a passageway 48 with which the flexible pipe 40 directly communicates. In the upper surface of the chamber 46 there are preferably, ribs 49 adapted to support the plastic sheet A, so as to keep it spaced from the bottom wall of the chamber.

The carrier is formed with vertical flanges 50 and 51 extending entirely around it at its extreme margin; which flanges are adapted to coact with the mold members to clamp the stock thereon and to cause the chambers to be enclosed against communication with the atmosphere by means of the stock. In the face of these mold members just inside of this marginal portion, there are formed shallow grooves 55. Suitable vents 56 of small bore lead from these grooves to the chamber 25.

In the form of device as illustrated in Figs. 3 to 6 inclusive, the construction of the mold press and the rods, for movably carrying the intermediate carrier, is similar to that already described, as this device is adapted for the formation of flush tank balls, a slightly different form of intermediate carrier is preferably employed and a slightly different form of lower mold member is employed. The carrier herein illustrated has its upper face formed with the pneumatic chamber 66 in which are formed the ribs 69 for supporting the stock of plastic material as before. The outer flange 70 projects upward and surrounds this chamber so as to hold the marginal portions of the stock as before. The carrier is shown as provided with a pocket 68 which communicates with the chamber 66. This pocket is connected to the pressure pipe 40 as before. The lower portion of the carrier may be formed of an open box-like chamber 72 surrounded by the flange 71. This chamber does not have communication with the pressure line and the flange 71 merely forms a spacing means adapted to seat upon the edges of the lower mold 73. This mold as shown is provided with a series of conical recesses 74 having openings 75 at the apex thereof. These recesses are adapted to receive the conical portions of a flush tank ball and to hold them in position. Such stock consists of semi-cured conical pieces B having metallic inserts embedded therein.

The operation of the device shown in Figs. 1 and 2 is as follows. A sheet of rubber or other plastic stock is cut substantially the size of the one of the mold members and placed manually or otherwise over the lower mold member 21. The sheet of plastic material $A^1$ is placed on the carrier and the carrier is then moved between mold members and the hydraulic press is operated to bring the mold members sufficiently together to cause the flanges 50 and 51 to press the respective plastic sheets directly against the marginal portion of the mold members. This makes an air-tight seal at such margin. The valve 42 is then opened to admit compressed air to the chambers 46 and 47.

Fig. 1 shows the apparatus with the stock held in position just ready to have the compressed air admitted to the chambers 46 and 47. This stock on the upper mold in Fig. 4 is shown as it appears seated after the air pressure has been applied. This same seating of the stock takes place in the mold members in both the upper and lower molds of the device illustrated in Fig. 1.

After the stock has been so seated, the lower platen is moved slightly downward so as to relieve the pressure on the carrier and the carrier is moved from between the molds. In Fig. 2, the carrier is shown in dotted lines partially withdrawn from between the molds.

After the carrier is completely removed, the hydraulic pressure is again applied to raise the lower mold. The molds are thus brought with their raised annular ribs 59 which surround the cavities, together. These ribs come to a blunt double beveled edge as shown. With the lower mold so raised the two molds are brought into coaction. This brings the two seated sheets into conjunction at the raised cutting edges. The peripheral seams are thereby formed about each article and the surplus stock is sheared off by the opposed cutting edges.

As heretofore stated, the form of mold cavities in Figs. 1 and 2 is selected for the manufacture of balls. These cavities are hemispherical except for an inner protuberance 80 which materially reduces the depth of the cavities and insures a more uniform seating. This particular feature is shown and claimed in my prior patent Reissue No. 14,604, dated March 4, 1919. As the two molds coming together causes the edges of the rubber stock to touch, the atmospheric air is thereby entrapped and the further movement of these mold members toward each other (equal substantially to twice the thickness of the plastic stock) reduces the cubical contents of the hollow articles so that the pressure within them is raised somewhat above the atmosphere. This causes an inner protuberance therein to blow outwardly so that the article assumes a spherical shape and tends to lift itself free from the cavity as soon as the mold members are separated.

In using the process for the manufacture of hollow articles, the article may then be transferred to a vulcanizing mold and vulcanized by internal pressure. This internal pressure may be obtained, for instance, by placing a small quantity of water in the portion of rubber seated in the lower mold cavities which becomes steam when the article is subjected to a vulcanizing heat. For some classes of material, this subsequent vulcanization need not be effected.

If the balls so made are to be inflated, a small series of Pará rubber plugs may be placed on the sheet A, preferably before the latter is put on the mold in such position that there is one plug for each cavity. A hypodermic needle may be passed through the article and this plug, and air thus admitted. The plug serves to seal this opening when the needle is withdrawn.

The operation of the device shown in Figs. 3 to 5 is very similar to that described above. The material in the lower mold, however consists of semi-cured stock and as heretofore stated, this stock is held in correct position in the cavities of the mold by means of the metallic stems 81 which may be threaded in the spud 80 embedded in the stock as is usual in the making of flush tank floats.

The seating of the stock in the upper mold takes place in the same manner as heretofore described in connection with the apparatus of Fig. 1. After the intermediate carrier has been withdrawn, the lower platen is moved upward so as to bring the mold members together to the position shown in Fig. 5 and in this manner, the edges of the material about the cavities of the upper mold are sheared off as before and will be attached to the edges of the opposed lower stock so as to form the completed article. When the molds are subsequently removed, since an increase of pressure in the interior has been caused in a manner similar to that described above, the stock in the cavities of the upper mold will move outward into approximately hemispherical form so as to produce the product as shown in Fig. 6, having a flexible hemispherical portion 82 and a stiff conical portion 83, the spud 80 being embedded in the conical portion and the stem or pin 81 threaded therein. This article may then be placed in a vulcanizing mold and vulcanized as desired.

It will be seen that the apparatus as disclosed provides a means for holding sheet rubber stock around the mold cavities and entirely independent of the cutting edges of these cavities.

Such independent clamping is shown in the devices illustrated as brought about by the clamping of the stock between the mold and carrier flange, by the clamping of the stock in the groove 55, and by the clamping of the stock in the regions intermediate of the cavities. The last two mentioned clampings are brought about by fluid pressure.

The result obtained by the clamping of the stock independently of the cutting edges of the cavities is that the stock is evenly seated within the cavities without wrinkling or puckering which takes place where it is attempted to hold the stock by the edges of the cavities as has been sometimes done in the past.

The vents 24, 27 and 56, which I provide from the cavities, spaces and channels are of very small bore, (the bore being exaggerated in the drawings for clearness of illustration) so that the air can pass back of the sheet only very gradually. Accordingly ample time is provided to remove the carrier and bring the molds together before material separation takes place between the seated stock and the mold surface.

It should be noted that the method of forming the article as described herein is claimed in my companion application, Serial No. 483,285 filed July 8, 1921.

Having thus described my invention, I claim:—

1. In an apparatus for making hollow articles of plastic material, a mold having a mold cavity therein, a member having an open ended chamber adapted to be brought opposite the stock, said member having means for clamping the stock in a circuit about the mold independently of the edges of the cavity and means for supplying fluid pressure higher than atmospheric to the chamber to seat the stock in the cavity without wrinkling.

2. In an apparatus for making hollow articles of plastic material, a mold having a mold cavity therein, and a depressed portion surrounding the cavity, and means for applying fluid pressure higher than atmospheric to the stock opposite the cavity and also opposite the depression while the air in the depression is maintained at atmospheric pressure, to seat a portion of the stock in the cavity, and clamp a surrounding portion in the depression.

3. In an apparatus for making hollow articles of plastic material, a mold having mold cavities therein, a member having a portion adapted to clamp a sheet of material on the mold independently of the edges of the cavities, and in a circuit surrounding the cavities said member having an open chamber adapted to be positioned adjacent the stock and means for applying fluid pressure higher than atmospheric to the chamber to force the stock opposite the cavities to seat such portion of the stock therein, while another portion is held clamped whereby a smooth seating of the material is obtained.

4. In an apparatus for making hollow articles of plastic material, a mold having mold cavities therein, a carrier for clamping a sheet of material on the mold in a region surrounding the cavities and independently of the edges of the cavities, said carrier having a space communicating with the stock opposite the cavities and means for applying fluid pressure higher than atmospheric to said space to seat the stock in the cavities whereby the stock may fit smoothly into the cavities without wrinkling.

5. In an apparatus for hollow articles of plastic material, a mold having a series of cavities, a carrier for clamping sheet stock on the exterior of the mold in regions surrounding the cavities, and adapted to be placed adjacent the mold and forming a chamber adjacent the mold and in communication with a source of pressure fluid supply, said chamber being open opposite the cavities and also opposite the space between the cavities whereby fluid pressure higher than atmospheric may be applied to the stock opposite the active face of the mold, to hold the material between the cavities and to seat the material in the cavities.

6. In an apparatus for making hollow articles of plastic material, a mold having a series of cavities, a carrier adapted to be placed adjacent the mold and having a flange adapted to contact with a continuous portion of the stock surrounding the cavities, to form a chamber adjacent the mold, said chamber being open opposite the cavities and also opposite the region between the cavities, and means for placing the carrier in communication with a source of fluid supply, whereby fluid pressure higher than atmospheric may be applied to the stock opposite the mold.

7. In an apparatus for making hollow articles of plastic material, molds having a series of cavities and depressions between the cavities, a carrier adapted to be positioned between the molds and having means for applying fluid pressure to stock held on the molds so as to seat the stock in the cavities and to pneumatically clamp the stock in the depressions.

8. In an apparatus for making hollow articles of plastic material, a mold having a cavity therein, a vent opening of small bore leading to the cavity, a depressed region about the cavity having a vent opening of small bore communicating therewith and means for applying fluid pressure higher than atmospheric to the stock opposite the cavity and the depression while the air in the depression is maintained at atmospheric pressure to seat the stock therein, whereby the stock may fit smoothly into the cavity without wrinkling, while the portion opposite the depressed portion is held therein.

9. In an apparatus for making hollow articles of plastic material, a mold having a series of cavities therein, a vent opening of small bore leading to the cavities, a depressed portion between the cavities having a vent opening of small bore and means for applying fluid pressure higher than atmospheric to the stock opposite the cavities and depressed portion while the air in the depressed portion is released to seat the stock therein, whereby the stock may fit smoothly into the cavity without wrinkling.

10. In an apparatus for making hollow articles of plastic material, a mold having a series of cavities, said mold having a depressed portion surrounding the cavities, and means for applying fluid pressure higher than atmospheric to the stock opposite the cavities and the depressed portion while the air therein is free for discharge, whereby portions of the stock about the cavities may be pneumatically clamped against the mold, and portions opposite the cavities may be forced into the cavities.

11. In an apparatus for making hollow articles of plastic material, a mold having a series of cavities, a region intermediate the cavities vented through the mold and adapted to have material pneumatically clamped thereon, and means for applying fluid pressure higher than atmospheric to the stock in regions opposite the cavities and the intermediate regions, while the air in such intermediate regions is maintained at a relatively lower pressure, whereby the stock may be pneumatically clamped between and be seated in the cavities.

12. In an apparatus for making hollow articles of plastic material, a mold having a series of cavities, said mold having depressed portions intermediate of the cavities, means for applying fluid pressure higher than atmospheric to the stock in regions opposite the cavities and opposite the depressed portions while the air in both cavities and the depressed portions is free for discharge, whereby the stock may be pneumatically seated in the cavities and depressed portion whereby smooth seating of the stock in the cavities is obtained.

13. In an apparatus for making hollow articles of plastic material, molds having a series of cavities and depressions between the cavities, a carrier adapted to be positioned between the molds and open on its opposite faces throughout the extent of the mold cavities and intermediate depressions and having borders surrounding the open faces, means for supplying fluid pressure to the interior of the carrier so as to seat the stock in the cavities and to pneumatically clamp the stock in the depressions, and means for bringing said portions of stock together while seated in the molds.

14. In an apparatus for making hollow articles of plastic material, molds having cavities surrounded by cutting edges, there being depressed portions surrounding the cavities of the molds, and a member adapted to be brought opposite the mold and having a flange for clamping the stock to the mold outside of the outermost cavities, and means for applying fluid pressure to the chamber formed by the flange and stock whereby the stock may be seated on the mold.

15. In an apparatus for making hollow articles of plastic material, two molds having opposed mold cavities, a carrier adapted to be placed between the molds and having a space bounded by a sheet of stock extending over mold cavities of one of the molds, means for creating fluid pressure higher than atmospheric in said space to act upon the stock opposite the cavities and opposite the spaces between the cavities of the mold and means for bringing the corresponding mold cavities in the two molds together to join the seated stock in the cavities of one mold to stock seated in corresponding cavities of the other mold.

16. In an apparatus for making hollow articles of plastic material, opposed molds having opposed cavities therein, a carrier for applying fluid pressure on the surface of a sheet of stock on one of the molds, said molds having a portion surrounding its cavities adapted to have the stock pneumatically clamped therein to the molds, means for applying fluid pressure to the stock opposite the cavities and opposite the surrounding portion for seating the stock smoothly in the cavities, and means for bringing the molds together to join the portions of material in corresponding cavities after the carrier has been removed from between the molds.

17. In an apparatus for making hollow articles of plastic material, a mold having downwardly opening cavities, a mold having upwardly opening cavities adapted to register with the cavities in the first mold respectively, a carrier adapted to be positioned between said molds, and having a flange for holding stock on one of said molds, said flange contacting with the stock about the cavities of the mold, a press for bringing the mold members toward each other to clamp said flange, and means for supplying fluid pressure to the entire space within the flange after it is clamped so as to force the stock into the cavities of the mold and against the mold regions between the cavities.

18. In an apparatus for making hollow articles of plastic material, two opposed mold members having registering cavities therein, a closure member adapted to be placed between the molds and having portions adapted to engage the marginal portions of sheet stock on one of the mold members while leaving the portion opposite the cavities free, means for supplying compressed air to the enclosed portion adjacent the sheet of stock, and means for bringing the mold members together to shear off the seated stock in the mold.

19. Mechanism for forming hollow articles of plastic material, including coacting dies having coacting cavities and against the confronting faces of which members sheet rubber is adapted to be disposed, and an entirely open frame having the general form of the dies but no larger in area than the area of the dies and adapted to be disposed between the dies, the wall of the frame being relatively thin and the frame being provided at one point with means whereby air may be injected into the space surrounded by said frame and between said sheets of rubber.

20. Mechanism for forming hollow articles of plastic material, including coacting dies having coacting cavities and against the confronting faces of which members sheet rubber is adapted to be disposed, and an entirely open frame having the general form of the dies but less in internal area than the area of the dies and adapted to be disposed between the dies, the wall of the frame being relatively thin and the frame being provided at one point with means whereby air may be injected into the space surrounded by said frame and between said sheets of rubber.

21. Mechanism for forming hollow rubber articles including opposed confronting dies having confronting cavities, the cavity in each die being defined by an outstanding wall, and a frame adapted to be disposed between the two dies and surrounding said wall, said frame being entirely open on both faces and having means whereby air may be forced into the space defined by said frame.

22. Mechanism for forming hollow articles of plastic material comprising opposed dies having confronting cavities, the dies being formed with cutting edges defining said cavities and overflow ducts surrounding the cutting edges of the die, and a skeletonic frame or air chamber adapted to extend over the entire area of the die body and resting only against the outer margin of the die bodies and being entirely open on its opposite faces, this frame being formed with means whereby air may be injected into the space within said frame.

23. Mechanism for forming hollow articles of plastic material comprising opposed dies having confronting cavities, the dies being formed with cutting edges and depressions surrounding the cutting edges of the die, and a skeletonic frame or air chamber adapted to extend over the entire area of the die body and resting against the outer margin of the die bodies, this frame being formed with means whereby air may be injected into the space within said frame, the dies having outlet air ducts communicating with the interior of the cavity.

24. Mechanism for forming hollow articles of plastic material comprising opposed dies having confronting cavities, the dies being formed with cutting edges and depressions surrounding the cutting edges of the die, and a skeletonic frame or air chamber adapted to extend over the entire area of the die body and resting against the outer margin of the die bodies, this frame being formed with means whereby air may be injected into the space within said frame, the dies having outlet air ducts communicating with the interior of the cavity, each duct being provided with a vent small enough to prevent the rapid inlet of air into the duct but permitting the outlet of air therefrom.

25. Mechanism for forming hollow articles from sheets of plastic material consisting of confronting dies, each die having a plurality of die cavities, the sheet rubber being adapted to be disposed against the confronting faces of the dies, each die having a series of communicating ducts communicating with each other and with the interior of the cavities, one of said ducts having an outlet and a skeletonic frame adapted to be disposed between the dies and between the sheet rubber applied thereto, the frame bearing at its edges only against the marginal portions of the two dies, said frame having an inlet whereby air may be forced into the space defined by said frame.

26. Mechanism for forming hollow articles from sheets of plastic material consisting of confronting dies, each die having a plurality of die cavities, the sheet rubber being adapted to be disposed against the confronting faces of the dies, each die having a series of communicating ducts communicating with each other and with the interior of the cavities, one of said ducts having an outlet and a skeletonic frame adapted to be disposed between the dies and between the sheet rubber applied thereto, the frame bearing at its edges only against the marginal portions of the two dies, said frame having an inlet whereby air may be forced into the space defined by said frame.

27. A mechanism for forming hollow rubber articles including opposed confronting dies each having a confronting cavity, the cavity in each die being defined by an outstanding wall, the space around said wall forming overflow ducts, the outstanding walls defining the cavities on one die being formed with a cutting edge, and a frame adapted to be disposed between the two dies and surrounding said wall, the frame being entirely open on its opposite faces and having means whereby air may be forced into the space defined by said frame.

28. Mechanism for forming hollow articles of plastic material, including coacting dies having coacting cavities and against the confronting faces of which members sheet rubber is adapted to be disposed, and a frame open above and below and having the general form of the dies but no larger in area than the area of the dies and adapted to be disposed between the dies, the wall of the frame being relatively thin and the frame being provided at one point with means whereby air may be injected into the space surrounded by said frame and between said sheets of rubber.

29. Mechanism for forming hollow articles of plastic material comprising opposed dies having confronting cavities, the dies being formed with cutting edges defining said cavities and overflow ducts surrounding the cutting edges of the die, and a frame or air chamber adapted to extend over the entire effective area of the die body and resting only against the outer margin of the die bodies and being entirely open on its opposite faces, this frame being formed with means whereby air may be injected into the space within said frame.

30. In an apparatus for making hollow articles of plastic material the combination of a press, two opposed mold members carried thereby and each having facing cavities with depressed regions between the cavities and annular cutting portions at the edges of the cavities, a closure member adapted to be placed between the molds and having an open face above and below to stand opposite the two molds and having a flange at its edge adapted to coact with the marginal portions of the mold members, means for operating the press to clamp sheet stock extending entirely across the open faces of the closure member in marginal regions to the mold members, means for supplying compressed fluid to the interior of the inclosure member after the same is clamped by the press, whereby such fluid may act to seat the stock both in the cavities of the molds and in the depressed portions between the cavities, said press being adapted to be opened to allow the closure member to be withdrawn and then operated to bring the mold members together to cut off the stock seated in the cavities.

31. An apparatus for making hollow articles of plastic material, comprising a two-part mold, each having a series of cavities with vents from the cavities and from the spaces between the cavities, and a fluid distributor adapted to be mounted between the molds and open toward the molds directly opposite the cavities therein and also the spaces between the cavities.

32. In an apparatus of the character described, a combination of a pair of molds, each having a set of cavities, a frame adapted to be placed between the molds and having a marginal portion to coact therewith to clamp the sheet rubber stock across the faces of the molds on opposite sides of the frame, said frame being open toward such sheet stock opposite the cavities and also opposite the spaces between the cavities, and means for admitting compressed air to the interior of said frame.

In testimony whereof, I hereunto affix my signature.

FRED THOMAS ROBERTS.